United States Patent
Chen

(10) Patent No.: US 7,508,278 B2
(45) Date of Patent: Mar. 24, 2009

(54) ASYMMETRY TRIANGULAR FREQUENCY MODULATION PROFILES FOR SPREAD SPECTRUM CLOCK GENERATIONS

(75) Inventor: Kuan-Da Chen, Taipei (TW)

(73) Assignee: VIA Technologies, Inc. (TW)

( * ) Notice: Subject to any disclaimer, the term of this patent is extended or adjusted under 35 U.S.C. 154(b) by 278 days.

(21) Appl. No.: 11/559,466

(22) Filed: Nov. 14, 2006

(65) Prior Publication Data

US 2008/0063130 A1 Mar. 13, 2008

Related U.S. Application Data

(60) Provisional application No. 60/824,845, filed on Sep. 7, 2006.

(51) Int. Cl.
*H03B 29/00* (2006.01)
*H03L 7/18* (2006.01)

(52) U.S. Cl. .................. 331/78; 331/16; 331/25

(58) Field of Classification Search ............ 331/1 A, 331/4, 16–18, 23, 25, 78; 326/93; 327/156–159; 329/325; 332/127; 360/51; 375/376; 455/260
See application file for complete search history.

(56) References Cited

U.S. PATENT DOCUMENTS 5,488,627 A 1/1996 Hardin et al.
5,812,940 A * 9/1998 Lindell ................. 455/114.1
2004/0213324 A1* 10/2004 Hall et al. ................. 375/130

OTHER PUBLICATIONS

Hardin et al. "Spread Spectrum Clock Generation for the Reduction of Radiated Emissions." IEEE International Symposium on Electromagnetic Compatibility. pp. 227-231. Aug. 1994.
Kim et al. "Spread Spectrum Clock Generator With Delay Cell Array to Reduce Electromagnetic Interfacence." IEEE Transactions on Electromagentic Compatibility. vol. 47, No. 4, Nov. 2005. pp. 908-920.

* cited by examiner

*Primary Examiner*—David Mis
(74) *Attorney, Agent, or Firm*—James W. Huffman; Jeff Hood

(57) ABSTRACT

Spread spectrum clock generation (SSCG) using asymmetric triangular profiles to reduce electromagnetic interference (EMI). The asymmetric triangular profiles provide better peak power attenuation and a more uniform power spectrum spread than conventional symmetric triangular profiles. The method receives a first clock signal that has a first frequency spectrum and modulates it with an asymmetric triangular profile to produce a second clock signal. The second clock signal has a wider frequency spectrum than the first clock signal and results in reduced electromagnetic interference compared with the first clock signal.

17 Claims, 8 Drawing Sheets

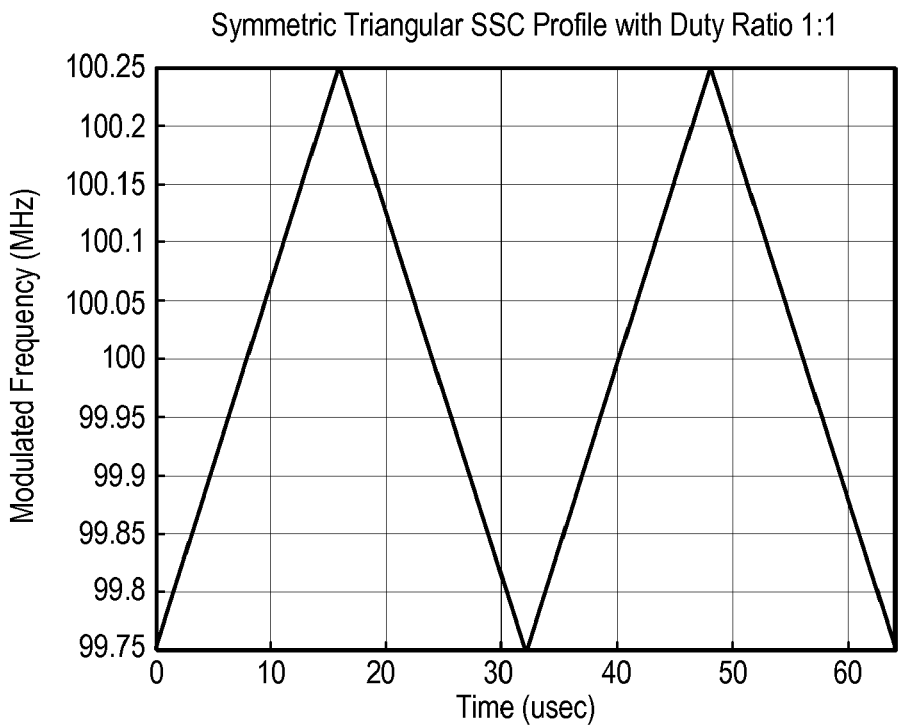
FIG. 1 – Prior Art
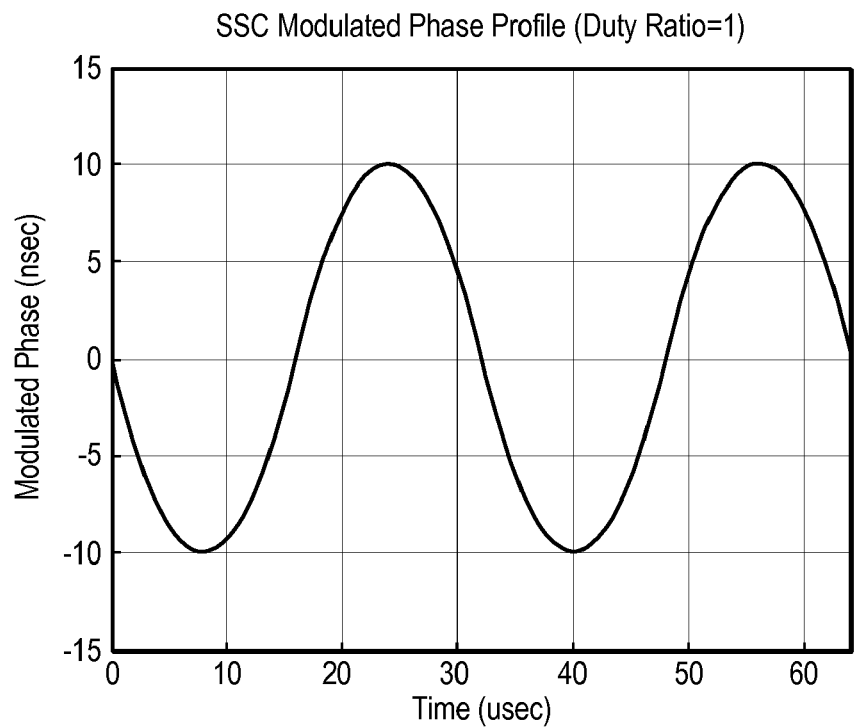
FIG. 2 – Prior Art

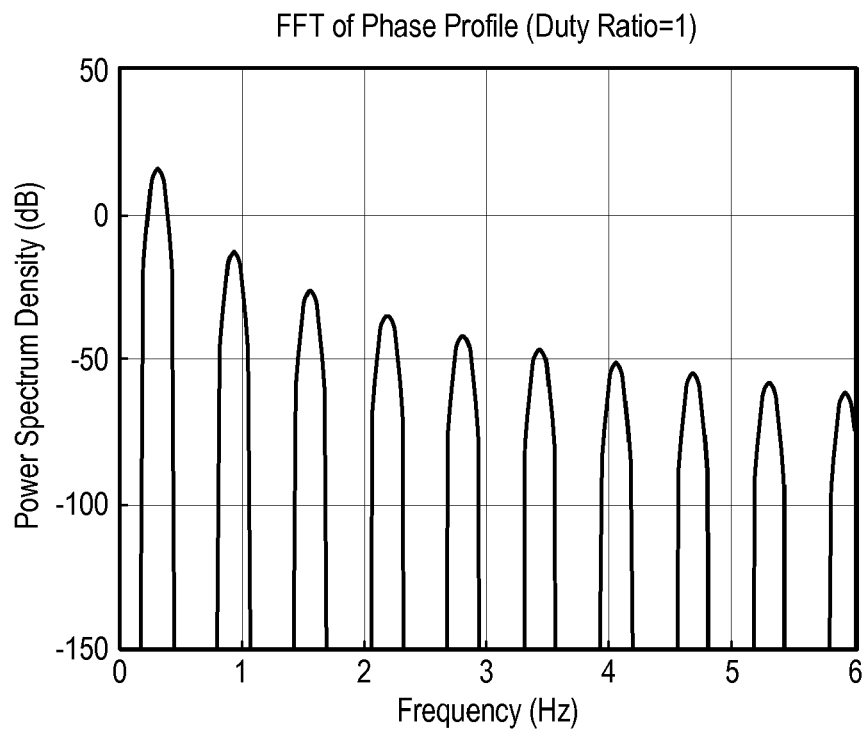
*FIG. 3 – Prior Art*
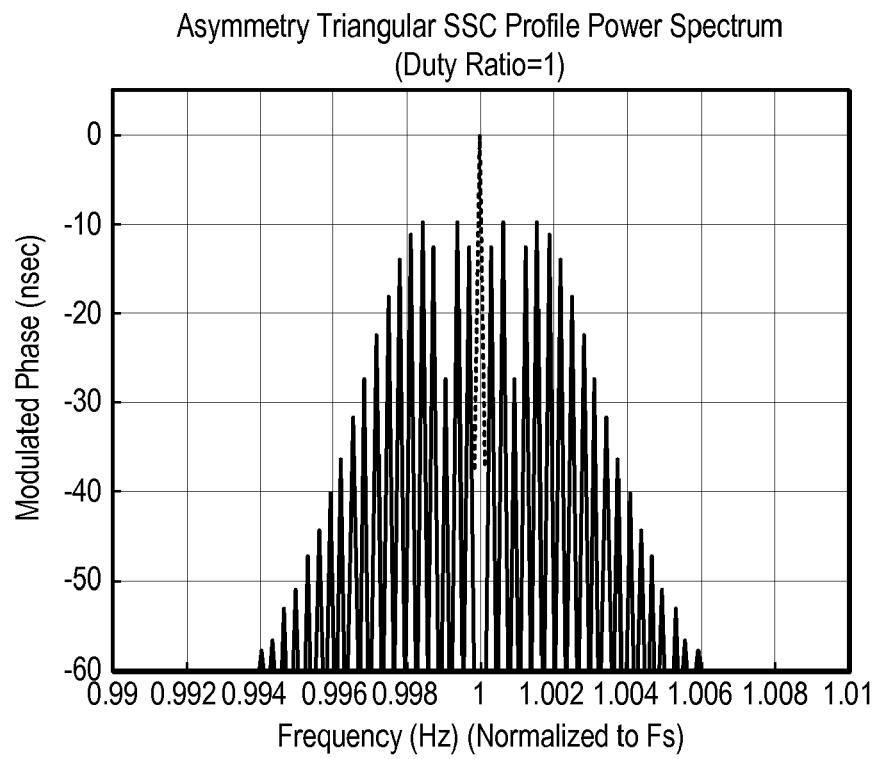
*FIG. 4 – Prior Art*

ASYMMETRY TRIANGULAR FREQUENCY MODULATION PROFILES FOR SPREAD SPECTRUM CLOCK GENERATIONS

FIELD OF THE INVENTION

The present invention generally relates to reducing electromagnetic interference (EMI) in electrical devices, and more particularly to performing spread spectrum clock generation (SSCG) using asymmetric triangular profiles that provide better peak power attenuation and power spectrum spread uniformity than conventional symmetric triangular profiles.

DESCRIPTION OF THE RELATED ART

As the operating speed (frequency) of electronic devices increases, electromagnetic interference (EMI) generated by these devices also increases significantly. Many methods can be used to reduce EMI, such as filtering, shielding, pulse shaping, slew rate control and spread spectrum clock generation.

In synchronous digital systems, a clock signal is used to drive the system, and the clock signal is often one of the major EMI sources. Because of its periodic nature, a clock signal has an unavoidably narrow frequency spectrum. In fact, a perfect clock signal would have all its energy concentrated at a single frequency and its harmonics, and would therefore radiate energy with an infinite spectral density. Practical synchronous digital systems radiate electromagnetic energy on a number of narrow bands spread on the clock frequency and its harmonics, resulting in a frequency spectrum that, at certain frequencies, can exceed the regulatory limits for electromagnetic interference (e.g. those of the Federal Communications Commission (FCC) in the United States, JEITA in Japan and the IEC in Europe).

Spread-spectrum clock generation (SSCG) is used in the design of synchronous digital systems, especially those containing microprocessors, to reduce the spectral density of the electromagnetic interference (EMI) generated by these systems. Spread spectrum clock generation (SSCG), which is a special case of wide-band frequency modulation (FM), can efficiently lower the fundamental and higher-order harmonics of the clock signal, e.g., reduce the peak radiated energy of the clock signal, to effectively reduce EMI emission. SSCG thus reshapes the system's electromagnetic emissions to comply with the electromagnetic compatibility (EMC) regulations.

SSCG does not reduce the total energy radiated by the system, but rather spreads the energy over a large frequency band, which effectively reduces the electrical and magnetic field strengths that are measured within a narrow window of frequencies. Spread spectrum clocking works because EMI receivers used by EMC testing laboratories divide the electromagnetic spectrum into frequency bands approximately 120 kHz wide. If the system under test were to radiate all of its energy at one frequency, then this energy would fall into a single frequency band of the receiver, which would register a large peak at that frequency. Spread-spectrum clocking distributes the energy so that it falls into a large number of the receiver's frequency bands, without putting enough energy into any one band to exceed the statutory limits.

In SSCG, the modulation profile determines the power spectrum of the frequency modulated clock. One nonlinear modulation profile is known as the "Hershey-Kiss" profile, which was proposed by K. B. Hardin, J. T. Fessler, D. R. Bush, "Spread Spectrum Clock Generation for the Reduction of Radiated Emissions," IEEE International Symposium on Electro-magnetic Compatibility, pp. 227-231, August 1994. The "Hershey-Kiss" profile shows good spreading, but its non-linear profile complicates the circuit implementation.

The symmetric triangular profile (FIG. 1) is a very popular linear profile and easy to implement. However, the spectrum of the clock signal is not evenly distributed and concentrated at several frequencies. As a result, many valleys appear in the power spectrum, which degrades the peak power attenuation. For example, in FIG. 1 the symmetric triangular profile with 0.25% center spread for 100 MHz clock signal has a period of 31.25 KHz, i.e., a period of 32 microseconds. FIG. 2 shows the phase profile of FIG. 1 which is obtained by integrating the frequency profile shown in FIG. 1 in the time domain. FIG. 3 illustrates the frequency transform (Fast Fourier Transform or FFT) of the phase profile of FIG. 2. FIG. 3 reveals that only odd-order harmonics of 31.25 KHz appear due to the waveform symmetry characteristics. It can also be easily shown that the envelope of FIG. 3 is the square of a SINC function.

FIG. 4 shows the power spectrum of the frequency modulated clock signal using a symmetric triangular profile. It can be shown that the power spectrum of the original clock signal whose power is concentrated at 100 MHz is distributed into a certain limited bandwidth leading to an attenuated clock signal peak power. FIG. 4 also reveals that there are two deep valleys in the power spectrum that degrade the efficiency of the power spread spectrum.

Therefore, an improved method is desired for performing spread spectrum clock generation (SSCG) to reduce electromagnetic interference (EMI).

SUMMARY OF THE INVENTION

Various embodiments are described of a system and method for performing spread spectrum clock generation (SSCG) to reduce electromagnetic interference (EMI). In one embodiment, spread spectrum clock generation (SSCG) is performed using asymmetric triangular profiles to provide improved EMI reduction. The asymmetric triangular profiles provide better peak power attenuation and a more uniform power spectrum spread than conventional symmetric triangular profiles.

In one embodiment, the method first receives a first clock signal that has a first frequency spectrum. The method then modulates the first clock signal with an asymmetric triangular profile to produce a second clock signal. The modulation may be performed by performing frequency modulation using the asymmetric triangular profile, or alternatively by performing phase modulation using a phase profile derived from the asymmetric triangular profile. The modulation may utilize a fractional-N phase locked loop, e.g., may utilize a sigma delta modulator that controls a multi-modulus divider.

The method may comprise generating the asymmetric triangular profile used in the modulation. In one embodiment, the method may comprise generating the asymmetric triangular profile by multiplying a first positive value with a first gain factor during a first time period, and multiplying a second negative value with a second gain factor during a second time period. The magnitudes of the gain factors and the time periods are different to produce the asymmetric triangular profile. In other words, the resulting asymmetric triangular profile has a positive slope and a negative slope, wherein the magnitude of the positive slope is different than the magnitude of the negative slope. An offset constant may be used to control one or more of a center spread, down spread or up spread of the asymmetric triangular profile.

The second clock signal has a second wider frequency spectrum than the first clock signal. The second clock signal can thus be routed throughout the system and used as the clock signal for various components present within the system. Use of the second clock signal results in reduced electromagnetic interference compared with the first clock signal.

Thus, embodiments of the invention use a symmetric triangular frequency modulation profile that operates to improve the peak power attenuation of the spread spectrum clock signal. Embodiments of the invention also reduce the difference of peaks and valleys in the power spread spectrum of the clock signal and make it more evenly distributed.

BRIEF DESCRIPTION OF THE DRAWINGS

The foregoing, as well as other objects, features, and advantages of this invention may be more completely understood by reference to the following detailed description when read together with the accompanying drawings in which:

FIG. 1 illustrates a symmetric triangular profile used for spread spectrum clock generation (SSCG) according to the prior art;

FIG. 2 illustrates a phase profile of the symmetric triangular profile of FIG. 1 according to the prior art;

FIG. 3 illustrates a power spectrum density of the phase profile of FIG. 2 according to the prior art where the frequency is normalized to 100 kHz;

FIG. 4 illustrates a power spectrum of the frequency modulated clock signal using the symmetric triangular profile of FIG. 1, according to the prior art;

Figure 5:
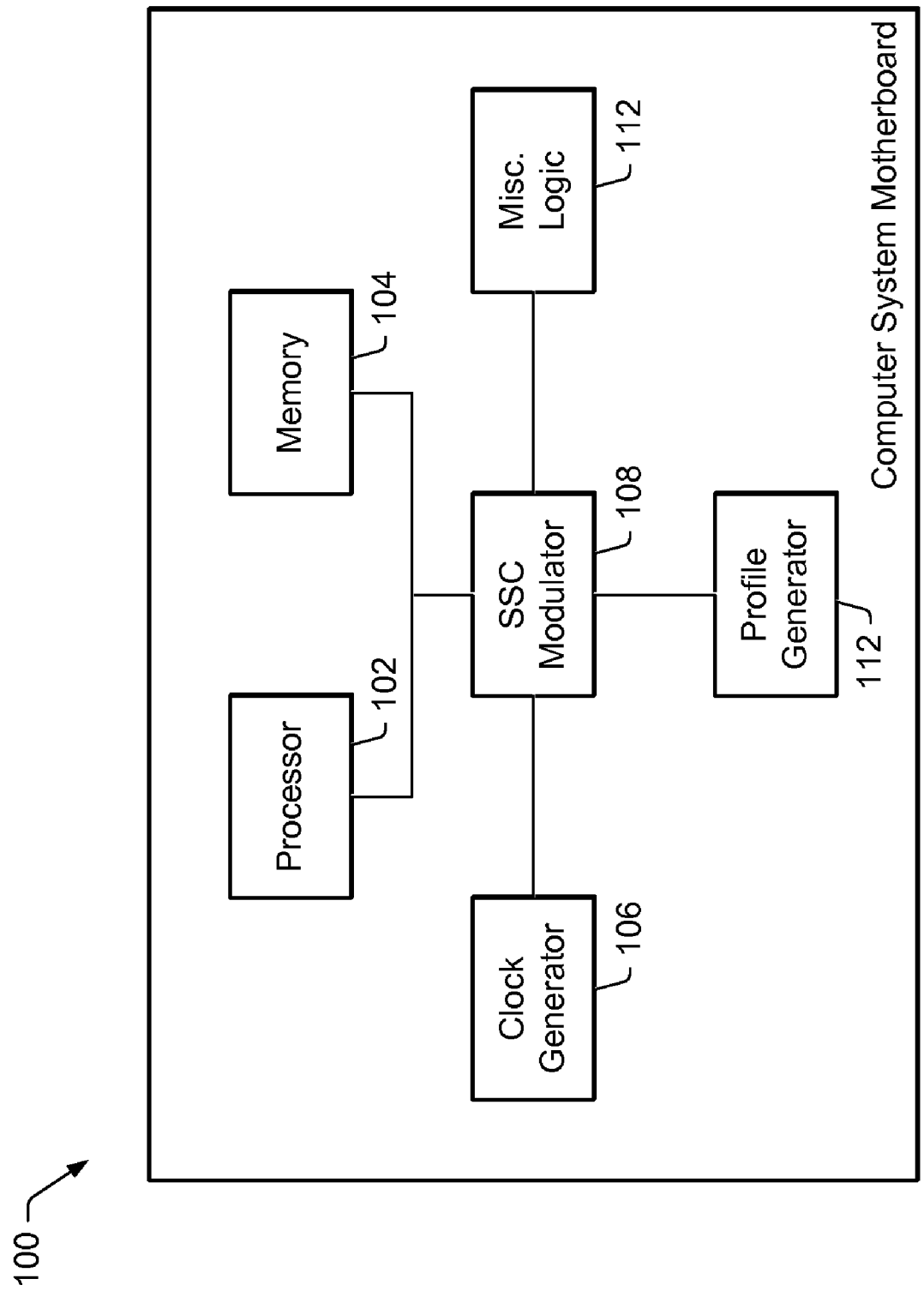
FIG. 5 illustrates an exemplary computer system motherboard which utilizes an asymmetric triangular profile according to one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to".

DETAILED DESCRIPTION OF THE EMBODIMENTS

FIG. 5 - System

FIG. 5 illustrates a computer system motherboard which may perform spread spectrum clock generation (SSCG) utilizing an asymmetric triangular profile according to one embodiment of the invention. Embodiments of the invention may be used in any of various systems or devices that use a clock signal, e.g., synchronous digital systems, and FIG. 5 is merely an exemplary embodiment. Other exemplary systems may include video data transmission using low-voltage differential signals (LVDS) with spread-spectrum clocks. Various of the components that would normally be present on the computer system motherboard, but which are not necessary for an understanding of the invention, have been omitted for simplicity.

As shown, the computer system motherboard may comprise a processor 102 and memory 104 coupled to the processor 102. The motherboard may comprise a clock generator 106, a spread spectrum clock (SSC) modulator 108 coupled to the clock generator 106, and a profile generator 112 coupled to the SSC modulator 108. The SSC modulator 108 may couple to the CPU 102 and memory 104, as well as various other miscellaneous logic 112, as shown.

The clock generator 106 may generate a first clock signal to the SSC modulator 108, where the first clock signal has a first frequency spectrum. The SSC modulator 108 may use the asymmetric triangular profile from profile generator 112 to generate a second clock signal. In other words, the profile generator 112 is operable to provide an asymmetric triangular profile to the SSC modulator 108, and the SSC modulator 108 is operable to perform spread spectrum modulation on the first clock signal using the asymmetric triangular profile to generate the second clock signal.

The second clock signal has a second wider frequency spectrum than the first clock signal. The second clock signal can thus be routed throughout the system and used as the clock signal for various components present within the system. For example, a shown in the exemplary embodiment of FIG. 5, the second clock signal may be provided to the CPU 102 the memory 104 and other miscellaneous logic 112. Use of the second clock signal results in reduced electromagnetic interference compared with the first clock signal.

Figure 6:
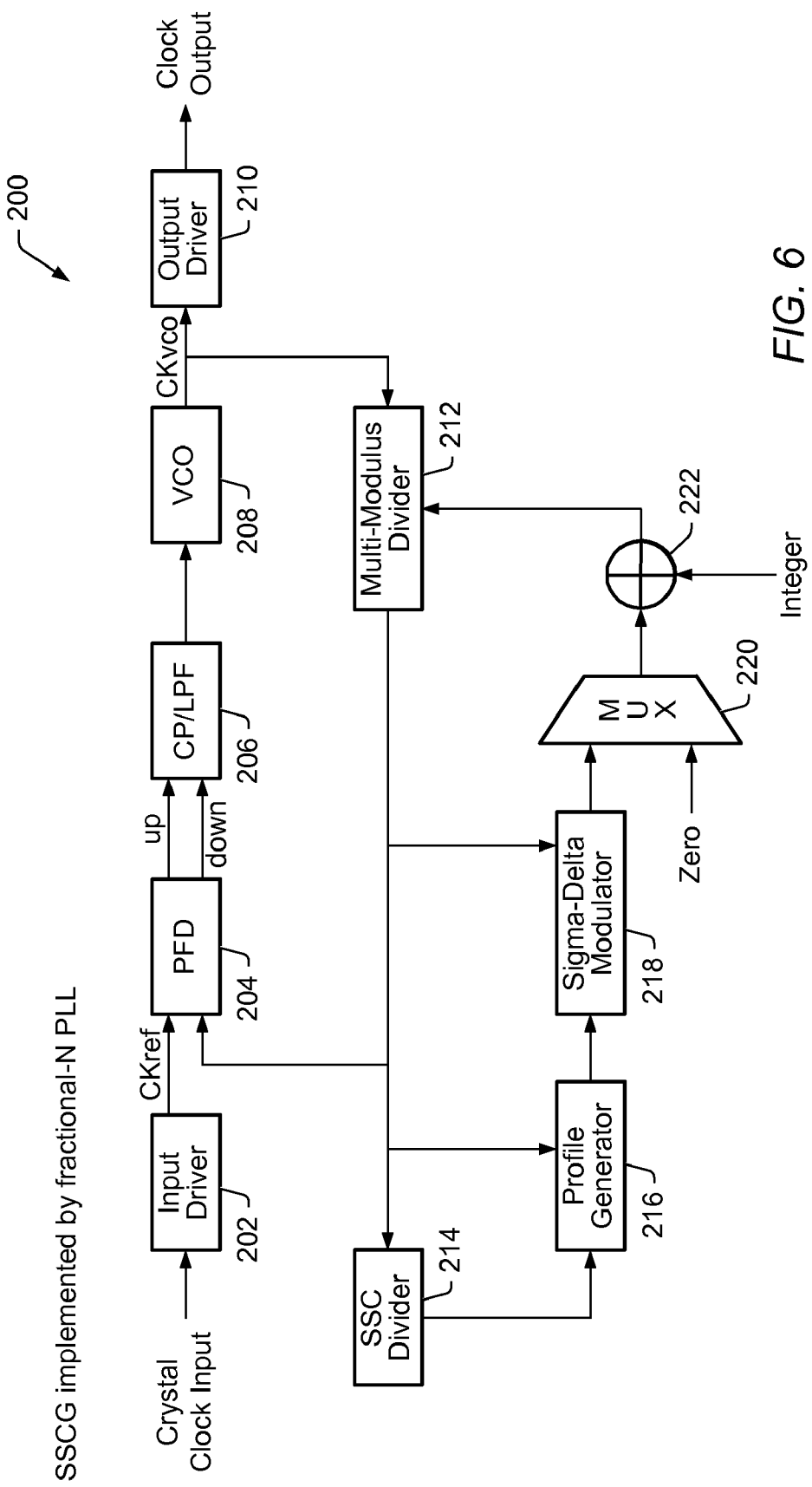
FIG. 6 illustrates a circuit diagram for implementing SSCG according to one embodiment of the invention.

FIG. 6 - SSCG Circuit Implementation

FIG. 6 illustrates an exemplary circuit implementation of the SSCG using an asymmetric frequency modulation profile.

As shown, the circuit 200 includes an input driver 202 that receives a crystal clock input signal. The input driver 302 provides an output CKref to an input of a phase-frequency detector (PFD) 204. The PFD 204 also receives an input from the output of multi-modulus divider 212. The PFD 204 uses the input from the output of multi-modulus divider 212 to modulate an asymmetric triangular profile on the clock signal to perform spread spectrum clock generation (SSCG). The PFD 204 compares the frequency and phase difference between the CKref and the output of multi-modulus divider 212. When the rising edge of the Ckref leads (or lags) that of the output of the multi-modulus divider 212, the PFD 204 produces an up (or down) pulse with a duration equal to the phase difference between them. The PFD 204 provides up and down output signals to a charge-pump and a low pass filter (CP/LPF) 206. The CP/LPF 206 filters the up/dn pulses and provides an increased/decreased output to control a voltage controlled oscillator (VCO) 208, wherein the increased/decreased control voltage increase/decrease the oscillation frequency of the VCO 208. The output of the VCO 208 is a signal referred to as CKVvco. The CKVvco signal is provided to output driver 210. The output driver 210 provides the clock output, wherein the clock output is an SSCG clock output that has been modulated with the asymmetric triangular profile. The clock output from the output driver 210 thus results in reduced electromagnetic interference as compared to the crystal clock input signal.

The programmable multi-modulus divider 212 provides an output to the PFD 204 and also to an SSC (spread spectrum clock) divider 214, a profile generator 216, and a sigma-delta modulator 218. The SSC divider 214 provides an output clock signal having an SSC modulation period, e.g. 32 us, to the profile generator 216. The profile generator 216 provides an output to the sigma-delta modulator 218. The sigma-delta modulator 218 provides an output to a 2-input multiplexer 220, wherein the second input of the 2-input multiplexer (mux) 220 receives a "Zero" value. Two-input mux 220 may be used to control whether the PLL output clock has SSC modulation or not. When mux 220 selects the Zero input, the PLL may be referred to as an integer-N PLL where the divider value is constant. When mux 220 selects the output of the sigma-delta modulator 218, the PLL may be referred to as a fractional-N PLL where the divider values vary from each period. The output of multiplexer 220 is provided to a summation node 222, which also receives an integer value. The output of the summation node 222 is provided to the multi-modulus divider 212.

Thus the SSCG is implemented by a fractional-N PLL and is comprised of an integer-N PLL with a multi-modulus divider 212, sigma-delta modulator 218 and profile generator 216. The output of profile generator 216 connects to the input of sigma-delta modulator 218. The output of sigma-delta modulator 218 is added to a nominal constant, and the result is used to control multi-modulus divider 212.

Figure 7:
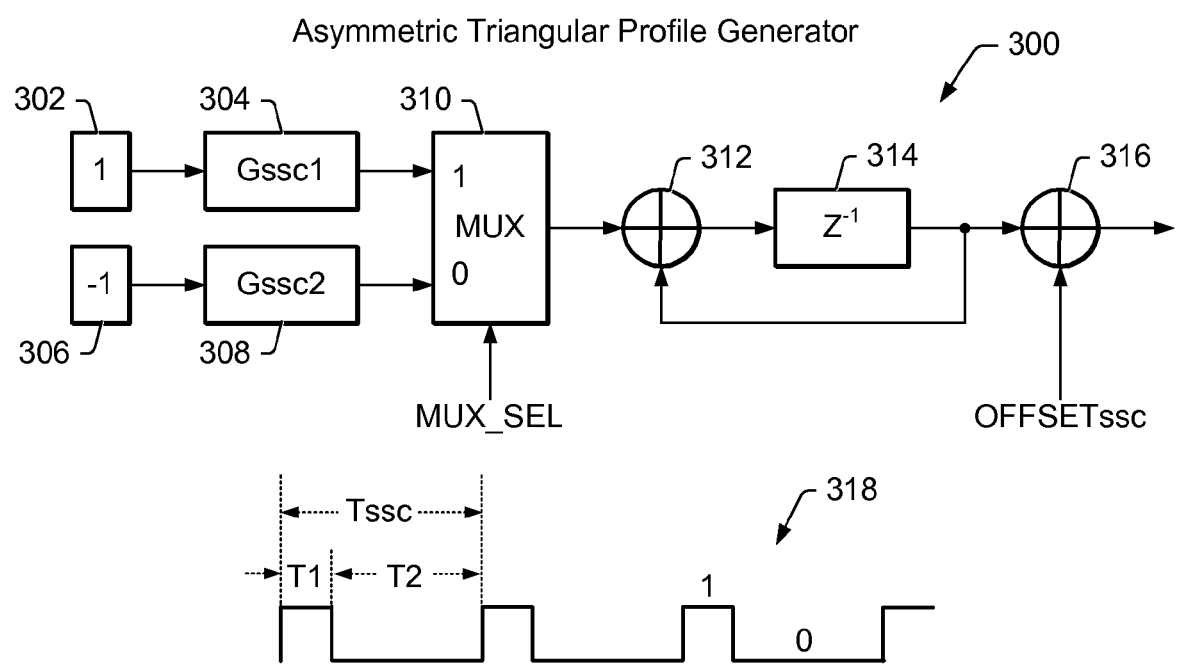
FIG. 7 illustrates a system for generating an asymmetric triangular profile according to one embodiment of the invention.

FIG. 7 - Profile Generator

FIG. 7 illustrates a system for implementing an asymmetric triangular profile generator 300 according to one embodiment of the invention. FIG. 7 illustrates an embodiment of one implementation of a generator for generating the asymmetric frequency modulation profile used according to one embodiment of the invention. In this embodiment, two gain elements Gssc1 304 and Gssc2 308 are connected to receive positive and negative gain values 302 and 304. The gain elements Gssc1 304 and Gssc2 308 provide their outputs to a 2-input multiplexer 310.

The selector input of the multiplexer 310 receives a clock signal that has a non 50% duty cycle. The clock signal having a non 50% duty cycle is used to select which multiplication gain factor will be used by an accumulator formed by adder 312 and delay element 314. As shown in FIG. 7, the clock signal has a period of Tssc, which comprises a high portion T1 and a low portion T2. As shown, in this embodiment, the low portion T2 is longer than the high portion T1.

The output of multiplexer 310 is provided to an input of 2-input adder 312. The output of the adder 312 is provided to delay element 314 in which the delay period is equal to the period of CKref or the output of multi-modulus divider 212. The output of delay element 314 is provided in a feedback path as a second input to adder 312. The offset constant (OFFSETssc) added at the output of adder 316 is used to control the center spread, down spread and up spread of the asymmetric triangular profile.

Thus, in one embodiment the asymmetric frequency modulation profile is obtained by using an accumulator with two proper gain factors (Gssc1 and Gssc2) for positive and negative slope of the asymmetric triangular profile.

Figure 8:
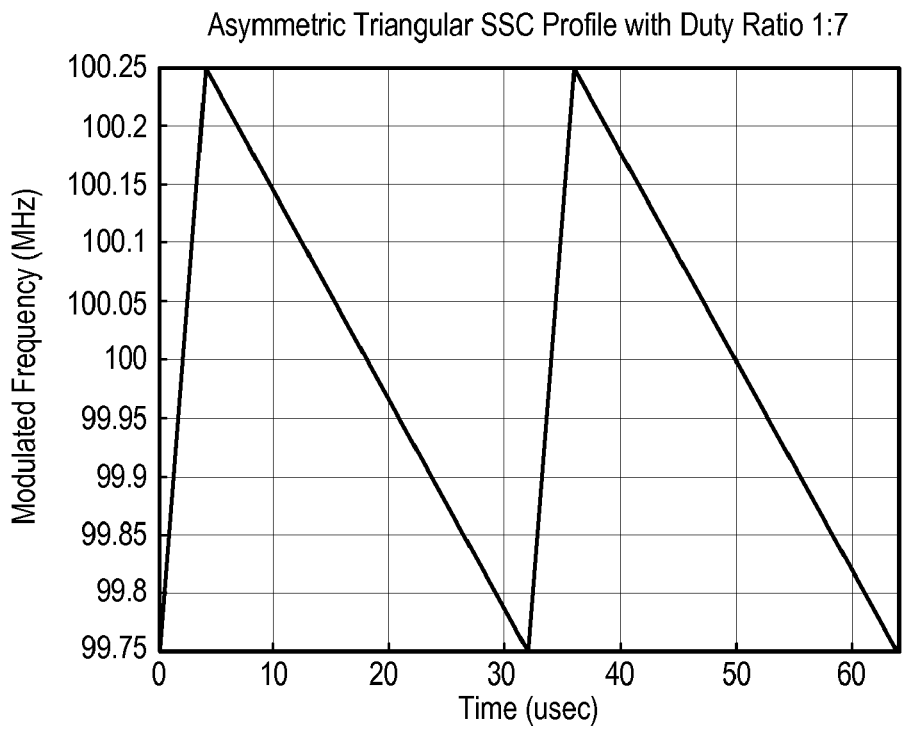
FIG. 8 illustrates an asymmetric triangular frequency modulation profile having a duty ratio of 7 according to one embodiment of the invention.

FIG. 8 - Asymmetric Triangular Frequency Modulation Profile

FIG. 8 illustrates an asymmetric triangular frequency modulation profile that can be used according to one embodiment of the invention. As shown, the asymmetric triangular frequency modulation profile has positive and negative slope durations that are not equal, i.e., the duty ratio of the profile is not equal to one. In the exemplary embodiment of FIG. 8, the asymmetric triangular frequency modulation profile has a duty ratio of 7 and the same frequency spread as in FIG. 1. In various embodiments, the duty ratio may be any number except one (which would be a symmetric profile). In one embodiment, multiplication of the positive slope and its time duration is the same as the multiplication of the negative slope and its time duration.

Figure 9:
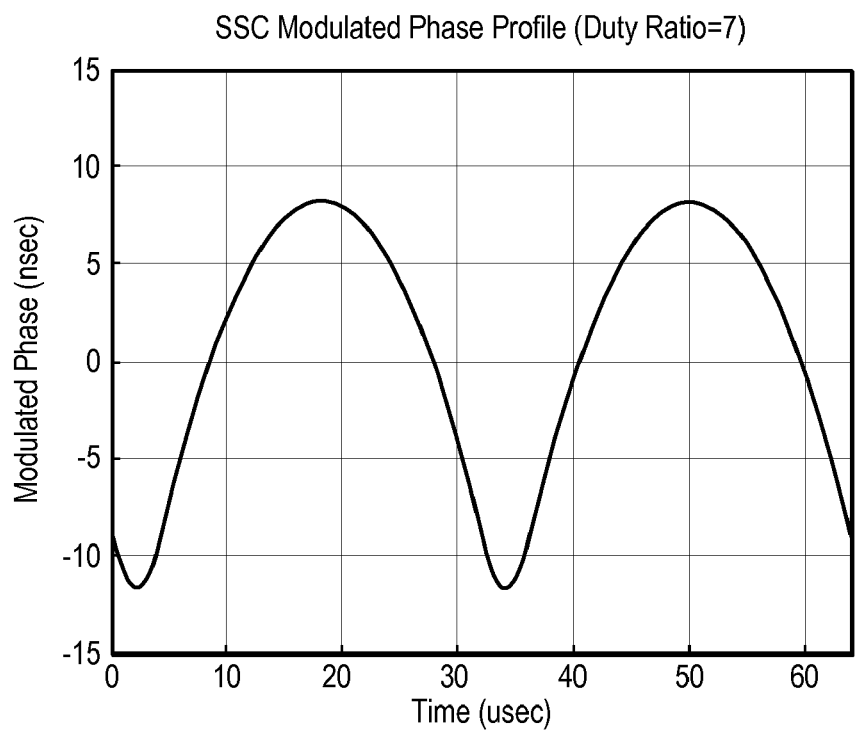
FIG. 9 illustrates a phase profile of the asymmetric triangular frequency modulation profile of FIG. 8.
Figure 10:
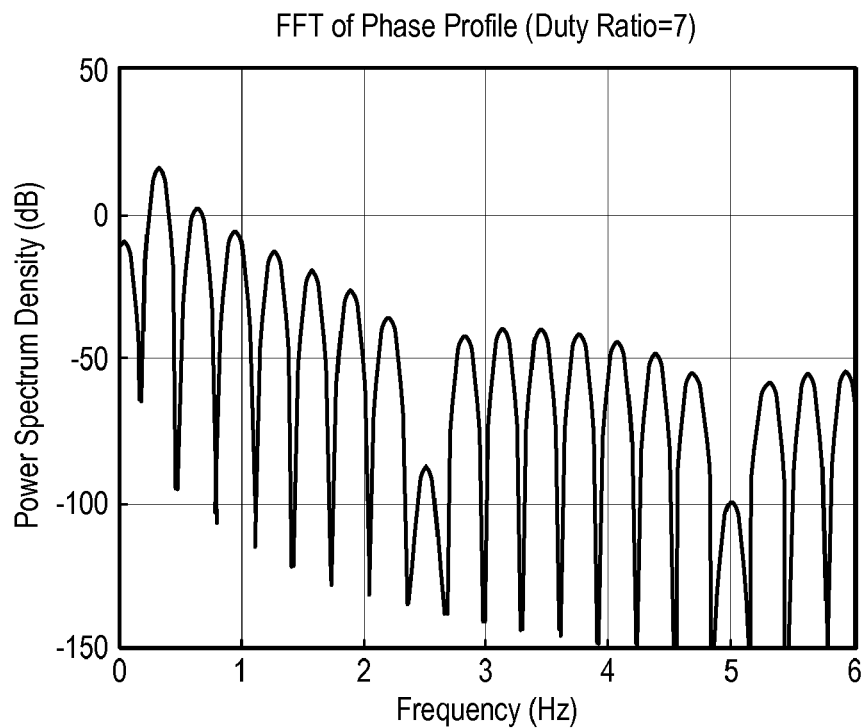
FIG. 10 illustrates a frequency domain transform of the phase profile of FIG. 9 where the frequency is normalized to 100 kHz.
Figure 11:
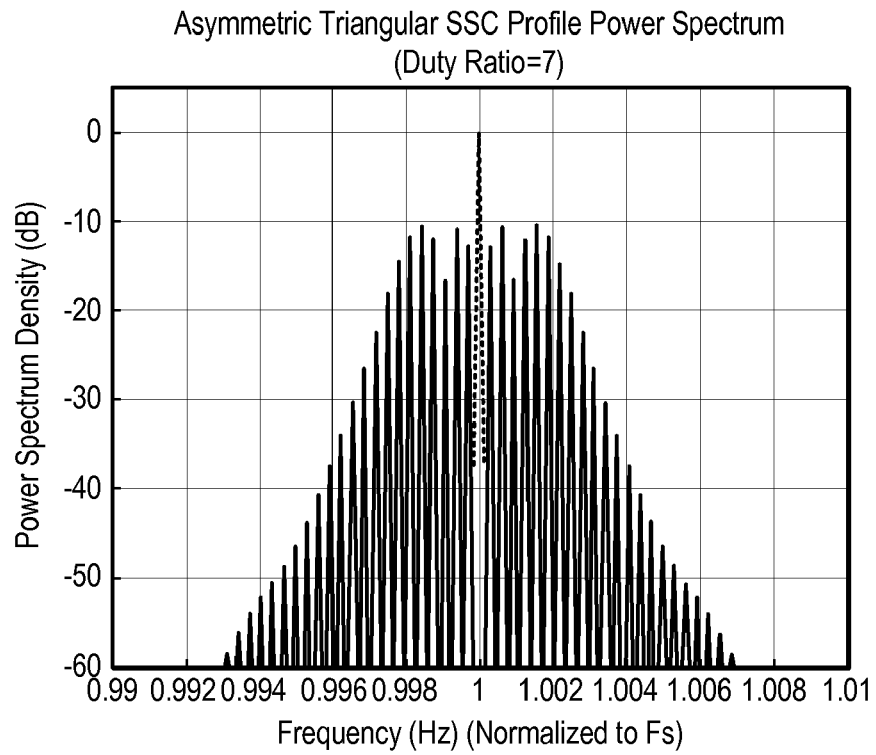
FIG. 11 illustrates a power spectrum of the frequency modulated clock signal using asymmetric triangular frequency modulation profile of FIG. 8.

FIGS. 9-11: Phase Profile

FIG. 9 illustrates the phase profile of the asymmetric triangular frequency modulation profile of FIG. 8. The phase profile is produced by integrating the frequency modulation profile in the time domain.

FIG. 10 shows the power spectrum obtained from FFT results of the phase profile in FIG. 9. The FFT results of FIG. 10 reveal that not only odd harmonics but also even harmonics appear in the frequency transform results of the phase profile due to asymmetric waveform characteristics compared with FIG. 4. The spread spectrum clock signal is then obtained by frequency modulation (FM) of the asymmetric triangular frequency modulation profile shown in FIG. 8 or by a phase modulation (PM) of the phase profile of FIG. 9. As shown in FIG. 11, the power spectrum of the spread spectrum clock signal is more evenly distributed, due to more harmonics being modulated in the clock signal. Therefore, the peak power attenuation increases as shown in FIG. 11. The difference between peaks and valleys is significantly reduced as compared with the prior art power spectrum shown in FIG. 4.

Figure 12:
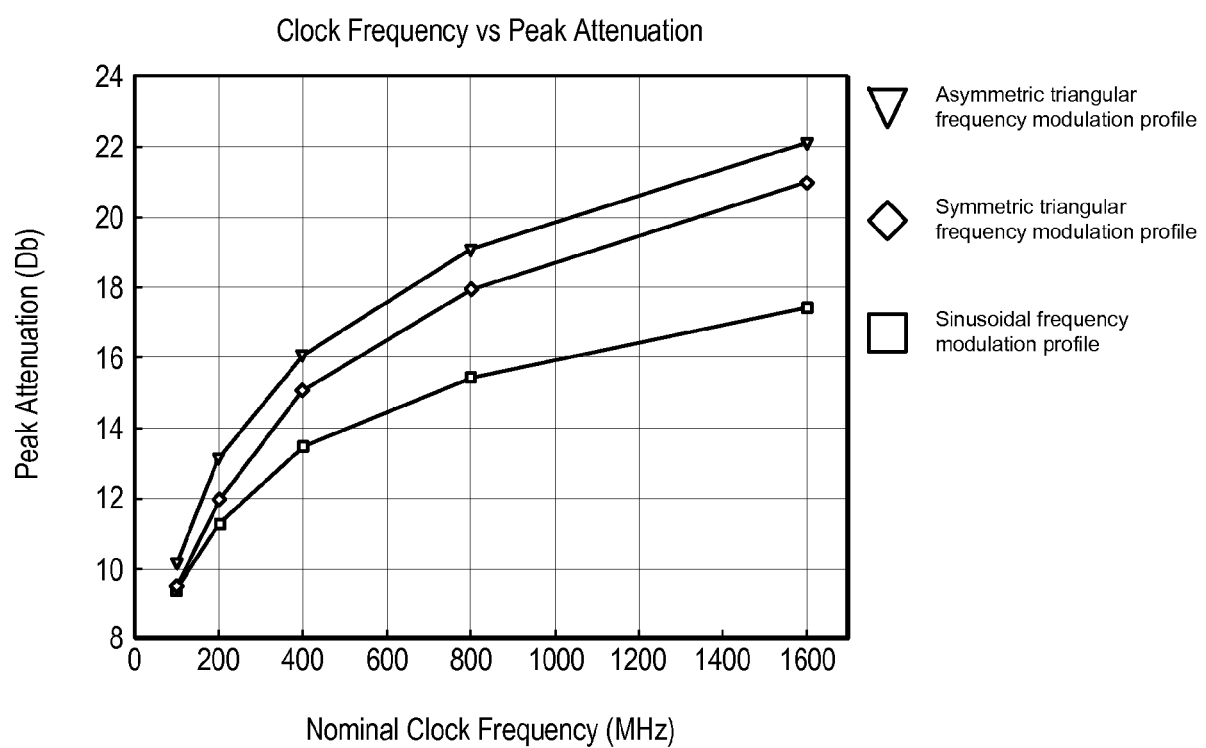
FIG. 12 illustrates comparisons of peak power attenuation of SSCG with sinusoidal, symmetric triangular, and asymmetric triangular frequency modulation profiles.

FIG. 12 illustrates comparisons of peak power attenuation of SSCG with sinusoidal, symmetric triangular, and asymmetric triangular frequency modulation profiles. As shown, the asymmetric triangular spread spectrum clock (SSC) has greater peak attenuation vs. nominal clock frequency as compared to sinusoidal SSC and symmetric triangular SSC.

Thus the use of an asymmetric triangular frequency modulation profile provides better peak power attenuation and a more uniform power spectrum spread than the prior art symmetric triangular profile. Embodiments of the invention that utilize an asymmetric frequency modulation profile have a very simple and low cost implementation.

I claim:

1. A method for generating a clock signal with reduced electromagnetic interference (EMI), the method comprising:
   receiving a first clock signal, wherein the first clock signal has a first frequency spectrum;
   sigma delta modulating the first clock signal with an asymmetric triangular profile to produce a second clock signal, wherein the second clock signal has a second wider frequency spectrum;
   wherein the second clock signal results in reduced electromagnetic interference compared with the first clock signal.

2. The method of claim 1, further comprising:
generating the asymmetric triangular profile prior to said modulating.

3. The method of claim 2, wherein said generating the asymmetric triangular profile comprises repeatedly performing:
multiplying a first positive value with a first gain factor during a first time period;
multiplying a second negative value with a second gain factor during a second time period;
wherein a magnitude of the first gain factor is different than a magnitude of the second gain factor.

4. The method of claim 3,
wherein the first gain factor produces a positive slope for the asymmetric triangular profile;
wherein the second gain factor produces a negative slope for the asymmetric triangular profile and the first time period is different from the second time period;
wherein a magnitude of the positive slope is different than a magnitude of the negative slope.

5. The method of claim 3, further comprising:
applying an offset constant to control one or more of a center spread, down spread or up spread of the asymmetric triangular profile.

6. The method of claim 1,
wherein said modulating the first clock signal comprises performing frequency modulation using the asymmetric triangular profile.

7. The method of claim 1,
wherein said modulating the first clock signal comprises performing phase modulation using a phase profile derived from the asymmetric triangular profile.

8. The method of claim 1,
wherein said modulating the first clock signal comprises applying a fractional-N phase locked loop to the first clock signal.

9. The method of claim 1,
wherein said modulating the first clock signal comprises:
generating the asymmetric triangular profile;
applying the asymmetric triangular profile to an input of a sigma delta modulator;
the sigma delta modulator generating an output; and
the sigma delta modulator output controlling a multi-modulus divider.

10. A system for generating a clock signal with reduced electromagnetic interference (EMI), the system comprising:
an input for receiving a first clock signal, wherein the first clock signal has a first frequency spectrum;
a phase-frequency detector for sigma delta modulating an asymmetric triangular profile on the clock signal to perform spread spectrum clock generation (SSCG), thereby producing a second clock signal; and
an output for providing the second clock signal;
wherein the second clock signal has a second wider frequency spectrum; and
wherein the second clock signal results in reduced electromagnetic interference compared with the first clock signal.

11. The system of claim 10, further comprising:
a multi-modulus divider which receives an asymmetric triangular profile and produces an output;
wherein the phase-frequency detector includes a first input for receiving an output from the multi-modulus divider and a second input for receiving a reference signal based on the first clock signal;
wherein the phase-frequency detector is operable to compare a frequency and phase difference between the reference signal and the output from the multi-modulus divider and generate an up/down pulse having a duration based on a phase difference between them.

12. The system of claim 11, further comprising:
a voltage controlled oscillator (VCO) coupled to receive the up/down pulse from the phase-frequency detector;
wherein the up/down pulse is operable to either increase or decrease, respectively, an oscillation frequency of the VCO;
wherein the VCO produces an output that is provided to an input of the multi-modulus divider.

13. The system of claim 12,
wherein the output of the VCO is provided through an output driver to produce the second clock signal.

14. The system of claim 12, further comprising:
a charge pump/low pass filter (CP/LPF) coupled between the phase-frequency detector and the VCO, wherein the CP/LPF filters the up/down pulses from the phase-frequency detector and provides an output signal to control the VCO.

15. The system of claim 11, further comprising:
a profile generator operable to produce an asymmetric triangular profile and provide the asymmetric triangular profile to the multi-modulus divider.

16. The system of claim 15, further comprising:
a sigma delta modulator coupled to an output of the profile generator, wherein the sigma delta modulator provides receives the output from the profile generator and generates an output to the multi-modulus divider.

17. A system for generating a clock signal with reduced electromagnetic interference (EMI), the system comprising:
an input for receiving a first clock signal, wherein the first clock signal has a first frequency spectrum;
means for modulating an asymmetric profile on the clock signal to perform spread spectrum clock generation (SSCG), thereby producing a second clock signal; and
an output for providing the second clock signal;
wherein the second clock signal has a second wider frequency spectrum; and
wherein the second clock signal results in reduced electromagnetic interference compared with the first clock signal.

* * * * *